United States Patent
Honda

(10) Patent No.: US 6,755,531 B2
(45) Date of Patent: Jun. 29, 2004

(54) MOTION PICTURE CODE EVALUATOR AND BILLING SYSTEM

(75) Inventor: Yoshizhou Honda, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 10/370,974

(22) Filed: Feb. 20, 2003

(65) Prior Publication Data

US 2003/0160945 A1 Aug. 28, 2003

(30) Foreign Application Priority Data

Feb. 25, 2002 (JP) ..................................... P. 2002-047677

(51) Int. Cl.[7] .......................... H04N 7/12; H04N 11/02
(52) U.S. Cl. .............. 352/236; 375/240.26; 375/240.29
(58) Field of Search .......................... 352/92, 244, 236; 375/240, 240.26, 240.29

(56) References Cited

U.S. PATENT DOCUMENTS

| 6,446,037 | B1 | * | 9/2002 | Fielder et al. .............. 704/229 |
| 2002/0021761 | A1 | * | 2/2002 | Zhang et al. .......... 375/240.27 |
| 2002/0097803 | A1 | | 7/2002 | Honda |
| 2002/0126258 | A1 | | 9/2002 | Honda |

OTHER PUBLICATIONS

U.S. patent application entitled, "A Motion Picture Code Evaluator and Related Systems," filed for Yoshizou Honda on Feb. 13, 2003.

\* cited by examiner

Primary Examiner—Russell Adams
Assistant Examiner—Arthur A Smith
(74) Attorney, Agent, or Firm—Fish & Richardson P.C.

(57) ABSTRACT

A motion picture code evaluator applicable to motion picture codes such as a scalability code, PB frame code and multi-object code is to be provided. Disclosed is a motion picture code evaluator for evaluating, on a motion picture receiver for receiving via transmission means a motion picture code including a scalability code including a basic layer code and an extended layer code, the total post-transmission motion picture information amount which is based on a motion picture code loss caused by the transmission means and decoding the motion picture code, comprising, motion picture code layer separation means for separating the basic layer code and the extended layer code from the motion picture code received, basic layer loss determination means and extended layer loss determination means for respectively determining a loss of the basic layer code and the extended layer code separated by the motion picture code layer separation means, and motion picture code evaluation means for evaluating the total post-transmission motion picture information in accordance with the outputs of the basic layer loss determination means and the extended layer loss determination means.

7 Claims, 5 Drawing Sheets

< EXAMPLE OF SCALABILITY CODE >

MOTION PICTURE CODE EVALUATOR AND BILLING SYSTEM

BACKGROUND OF THE INVENTION

1. Field of the Invention

The present invention relates to a motion picture code evaluator and in particular to a motion picture code communications evaluation technology to simultaneously evaluate and test the motion picture quality of digital motion picture data transmitted in parallel to a large number of users by using a scalability code.

2. Description of Related Art

A related art technology concerning a motion picture code communications evaluator for evaluating the motion picture quality of transmitted digital motion picture data is disclosed in the Japanese Patent Application No. 2001-049544 "A motion picture communications evaluator and related systems" by the same inventor.

The related art technology will be summarized insofar as it is related to the invention.

A digital motion picture is a continuous sequence of instantaneous pictures in time called motion picture frames.

Data of a digital motion picture is generally huge. Thus, motion picture code transmission is generally performed where compression or encoding of information is made for data communications, followed by a decoding process to regenerate a motion picture. A sequence of motion codes is also called a stream.

A scalability code refers to a method for transmitting codes in hierarchical form to input only codes fit for the processing scale of the receiver or only those fit for the transmission path when there are a variety of receivers and transmission path scales.

Specific examples will be given later.

For example, international standards for motion picture codes includes, for example, MPEG (Moving Picture Experts Group)-2 (ISO/IEC13818) and MPEG-4 (ISO/IEC14496) specified by ISO/IEC (International organization for Standardization/International Electrotechnical Commission), and H.263 specified by ITU (International Telecommunication Union) recommendations.

The invention is applicable to similar motion picture codes as well as the international standards.

In the aforementioned motion picture code, frames comprise pixels arranged in a shape of a grating. A format comprising 352 pixels in the horizontal direction and 288 pixels in the vertical direction are often used.

The number of pixels which constitute a frame is also called resolution or a screen size.

In the case of a color image, the number of pixels is often referred to as the structure of a luminance screen (Y).

Colors and gray-scale levels in a color image are often represented as a luminance and two types of color difference values to represent colors.

A format which assigns two color difference pixels per luminance of two by two pixels or one which assigns four difference pixels are available.

The number of frames per unit time may be 30 frames per second or 15 frames per second. The greater this figure is, the smoother motion is represented, that is, the higher-quality picture is obtained.

The greater the number of pixels per frame is, the higher-resolution motion picture is obtained. The greater the number of pixels per unit time is, the smoother motion picture, or higher-resolution motion picture is obtained. However, this results in a greater load on a transmission path, transmitter or receiver.

This problem is solved by a motion picture communications method whereby the resolution is increased or decreased by twice or four times in the midst of transmission in order to keep up with a change in the substantial throughput caused by network congestion or radio wave propagation.

In terms of representation of colors and gray-scale levels in digital values, intermediate halftones from the darkest black to the lightest white are quantized. In general applications, levels in the neighborhood of 256-level gray scale which can be visually represented in eight bits are often used.

An image with a smaller change in gray-scale levels can be represented by a smaller number of gray-scale levels. For a color image, the number of quantization levels is the number of colors unless otherwise specified.

The greater the number of gray-scale levels or colors is, the higher-quality picture is obtained although this places a greater load on a transmission path, transmitter or receiver. This problem is solved by extending the width of quantization thus reducing the number of gray-scale levels.

A change in the number of gray-scale levels is often made even within a single frame.

Talking of a certain pixel, the narrower the quantization width is, that is, the greater the number of gray-scale levels or colors is, the more information is included.

The total sum value of the number of gray-scale quantization levels within a specified period across the pixels in all the frames is called the motion picture information amount here.

Roughly speaking, the larger the motion picture information amount is, the higher-quality picture is obtained.

As far as the compression ratio of motion picture encoding does not noticeably vary, the wider the band of a motion code is, the larger the motion picture information amount is, thus the higher-quality picture is obtained. This results in a greater load on a transmission path, transmitter or receiver. A method for operating a service with a high charge may be used to offset this drawback.

Charging on the basis of the occupied bandwidth and occupied time focuses on the cost of transmission path and transmission equipment while charging on the basis of the motion picture information amount focuses on the quality of an application. The latter method is importance because it likely to gain the consensus of users.

Quality degradation of a motion picture in the course of transmission of a motion picture code will be described.

In communications of a motion picture code, the receiving party obtains a lower quality picture than the original for the following reasons:

A transmission error may prevent a motion picture code from being properly received.

Some packets may be lost halfway as a result of data transmission in packets.

Communications of motion picture codes may take excessive time. An encoded motion picture frame may not be ready for display at the timing of the display in the ongoing motion picture playback. In this case, display of the motion picture frame is skipped to shift to the processing of the next motion picture frame.

In this way, a section which failed to display an encoded picture of the original motion picture is called a loss of motion picture.

A transmission error has different effects on the decoded motion picture to be displayed, depending on the section where the error has taken place.

A section which accommodates parameters to represent the specifications for the entire motion picture codes such as the screen size of a motion picture code and a color difference format as well as codes used in the predictive encoding system and prediction method for the entire frame is called a header.

In case a transmission error has occurred in the header section, the entire motion picture may be seriously affected or display of the entire decoded frame may be disabled.

In case a transmission error has occurred in a section concerning the gray-scale level of pixels in a frame, display of the decoded pixel may be disabled.

In this way, the amount of motion picture codes not used for display of decoded pictures due to a transmission error and a delay and the amount of loss of a decoded motion picture are not in a fixed relationship. Thus, a loss of the motion picture must be evaluated on demand.

However, calculating the motion picture information amount and motion picture loss amount each time motion codes are received on all the receivers will require a huge processing scale.

In particular, processing to decode a motion picture and reproduce a picture involves a huge workload. Thus, in practice, only limited sections are read such as the header of a motion picture code for further processing.

Actually, an effective motion picture quality check is conducted before starting a service. This check includes a server load test which verifies whether a motion picture server or cache server can transmit quality motion pictures in response to multiple access by a large number of users and a motion picture quality probing (temporarily called) which captures motion codes for degradation in a concentrator where motion codes destined for a large number of users flow on the same transmission path, for example just after the codes have left the motion picture server.

In this way, the Japanese Patent Application No. 2001-049544 "A motion picture communications evaluator and related systems" by the same inventor provides an apparatus for evaluating the motion picture information amount and motion picture loss amount.

A configuration example will be explained referring to a motion picture code evaluator 501 of FIG. 5.

The motion picture code evaluator 501 shows the configuration of apparatus which inputs and detects a motion picture code for a specific user. In the example, a motion picture is not decoded or a picture is not reproduced. Thus, motion picture codes destined for a large number of users are simultaneously processed.

In FIG. 5, a header tester 52 extracts a motion picture frame header. In case any error is detected, the header tester 52 determines the corresponding frame as a loss. In case no error is detected, the header tester 52 reads the time stamp. In case a delay is detected, the header tester 52 determines the frame as a loss.

A screen size extractor 53 reads the screen size. A frame rate extractor 54 reads the frame rate or converts the timing of the frames and number of frame headers within a certain period. A quantization roughness extractor 55 reads the quantization roughness.

A motion picture information calculator 51 obtains the number of gray-scale levels from the quantization roughness and sums up the number of gray-scale levels for all the pixels across the frames.

The motion picture information amount of a frame assumed as a loss is not added. In case the predicted number of frames cannot be read from the frame rate, a frame loss is assumed. The frame loss determined from an error in a motion picture frame header is added to this frame loss and the resulting frame loss is divided by the predicted number of frames to obtain a frame loss ratio.

The motion picture information calculator 51 provides the loss/normality check result of each frame, motion picture information amount, number of motion picture frames, and motion picture code amount as an output 503. Although not detailed, these data are summed across the motion picture frames within the evaluation range.

In the Japanese Patent Application No. 2001-391370 "Motion picture delivery test apparatus" by the same inventor, the predicted type of each frame is read by a motion picture frame predicted type section, and other frames referencing a frame determined as a frame loss are also assumed as frame losses by reference-non-reference relationship of the frames and added to the aforementioned number of frame losses.

The aforementioned motion picture code is generated in the course of frame-based encoding of a motion picture comprising a sequence of motion picture frames on a single screen. In the motion picture stream thus generated, codes related to a motion picture frame are arranged in the form of a motion picture frame header and a motion picture frame data section in this order. This structure is repeated in the order of motion picture frame sequences. This is called a single video layer code here.

A motion picture frame may comprise a plurality of codes: an encoded simple image of poor quality and an encoded difference between the original picture and the image of poor quality.

This structure is called a scalability code as mentioned earlier.

FIG. 2 shows an example of a scalability code relating to resolution. A motion picture with smaller number of pixels, that is, a high-resolution motion picture is encoded as a basic low-resolution layer motion picture and the extended layer motion picture corresponding to the difference from the original. In a decoding process, by adding a motion picture obtained by decoding the extended layer code to the basic layer motion picture obtained by decoding the basic layer code, a high-quality motion picture is obtained.

A plurality of subjects may be respectively encoded. In this case, a single screen is obtained by synthesizing the subjects obtained by decoding the subjects encoded.

This is called a multi-object code. Digitized form of each subject is called a video object.

Two adjacent motion picture frames may be encoded in one operation, which is an encoding system called a PB frame mode.

In this encoding system, frames can be inserted with a smaller number of codes thus allowing smoother motion.

The aforementioned MPEG-2, MPEG-4 and H.263 specify the scalability code as follows:

A motion picture with a greater quantization width and a smaller number of gray-scale levels is assumed as a basic motion picture. Encoding result of a basic motion picture is called a basic stream. Encoding result of the difference between the original high-quality motion picture and the basic motion picture is called an extended stream.

For example, in a system for transmitting a signal by modulating a carrier wave, the basic stream includes a signal obtained by modulating a carrier wave at a low frequency while the extended stream includes a signal obtained by modulating the carrier wave at a high frequency. A low-cost terminal obtains a basic motion picture by demodulating only a low-frequency modulated signal to decode the basic stream, while a high-cost terminal obtains the original high-quality motion picture by modulating a high-frequency modulated signal also to decode the extended stream and adding the extended stream to the basic motion picture.

The H.263 specifies the PB frame mode where adjacent frames are encoded in one operation.

In H.263 and MPEG-2, a frame is also referred to as a Picture, and hereinafter treated as such.

In MPEG-4, the pixel size, frame rate and width of quantization are specified per plurality of video object. How each object synthesizes the screen is also specified.

Whether the scalability code is applied or not is determined per object.

In MPEG-4, the motion picture frame of each video object is called a plane or Video Object Plane (VOP).

The scalability code in MPEG-2, MPEG-4 and H.263, PB frame mode in H.263, and multi-object code in MPEG-4 are not mandatory but may be selected to be used or not used.

In the related art method, it is not possible to evaluate in parallel the motion picture quality of a plurality of streams other than those including a single video layer code.

SUMMARY OF THE INVENTION

An object of the invention is to provide a motion picture code evaluator applicable to motion picture codes such as a scalability code, PB frame code and multi-object code.

In order to solve the problems, a first aspect of the invention provides a motion picture code evaluator for evaluating, on a motion picture receiver for receiving via transmission means a motion picture code comprising a scalability code including a basic layer code and an extended layer code, the total post-transmission motion picture information amount which is based on a motion picture code loss caused by the transmission means and decoding the motion picture code, comprising, motion picture code-layer separation means for separating the basic layer code and the extended layer code from the motion picture code received, basic layer loss determination means and extended layer loss determination means for respectively determining a loss of the basic layer code and the extended layer code separated by the motion picture code layer separation means, and motion picture code evaluation means for evaluating the total post-transmission motion picture information amount in accordance with the outputs of the basic layer loss determination means and the extended layer loss determination means.

A second aspect of the invention provides a motion picture code evaluator comprising, in the determination by the basic layer loss determination means, a total motion picture information amount is set to zero for a basic layer loss, while in the determination by the extended layer loss determination means, the motion picture information amount of the basic layer is employed as a total motion picture information amount for an extended layer loss and that in case the determination by the basic layer loss determination means and the extended layer loss determination means has detected no losses, a weight which is based on the frame time interval after synthesis of the basic layer and extended layer is used to obtain the sum value the motion picture information amount in the frames, which sum value is employed as a total motion picture information amount, the motion picture information amount of either the basic layer or extended layer of whichever the resolution is higher is employed as a total motion picture information amount, or the quantization roughness of either the basic layer or extended layer of whichever the quantization roughness is finer is used and the motion picture information amount obtained by adding the number of gray-scale levels across the number of pixels of the extended layer is employed as a total motion picture information amount.

A third aspect of the invention provides a motion picture code evaluator for evaluating, on a motion picture receiver for receiving via transmission means a motion picture code comprising a scalability code including a basic layer code and an extended layer code, the total post-transmission motion picture information amount which is based on a motion picture code loss caused by the transmission means and decoding the motion picture code, comprising, motion picture code layer separation means for separating the basic layer code and the extended layer code from the motion picture code received, basic layer loss determination means for determining a loss of the basic layer code separated by the motion picture code layer separation means, and motion picture code evaluation means for evaluating the total post-transmission motion picture information amount in accordance with the output of the basic layer loss determination means.

A fourth aspect of the invention provides a motion picture code evaluator for evaluating, on a motion picture receiver for receiving via transmission means a PB frame mode motion picture code, the total post-transmission motion picture information amount which is based on a motion picture code loss caused by the transmission means and decoding the PB frame mode motion picture code, comprising, header test means for checking the frame header of PB frames of a motion picture code in the PB frame mode for normality or loss, screen size extraction means and frame rate extraction means for respectively reading the screen size and number of frames of the PB frames from the PB frame header, Picture P quantization roughness extraction means for reading the Picture P quantization roughness of the PB frames from the PB frame header, Picture B quantization roughness extraction means for reading the Picture B quantization roughness of the PB frames from the PB frame header, Picture P motion picture information amount calculation means for calculating the Picture P motion picture information amount from the screen size and the Picture P quantization roughness, Picture B motion picture information amount calculation means for calculating the Picture B motion picture information amount from the screen size and the Picture B quantization roughness, and totals the motion picture information amount of normal frames from the result of determination of the number of frames and the frame loss, and employs the resulting motion picture information amount as a total motion picture information amount.

A fifth aspect of the invention provides a motion picture code evaluator for evaluating, on a motion picture receiver for receiving via transmission means a motion picture code comprising a multi-object code, the total post-transmission motion picture information amount which is based on a motion picture code loss caused by the transmission means and decoding the motion picture code, comprising, a plurality of motion picture information amount calculation means for calculating the motion picture information amount per object included in a frame of a received motion picture code comprising a multi-object code and totals the outputs of the motion picture information amount calculation means modified by a weight per object and employs the total value as a total motion picture information amount.

A sixth aspect of the invention provides a multiple motion picture stream evaluator comprising a plurality of motion picture code evaluators according to any one of the first through fifth aspects, arranged to process a plurality of motion picture streams in parallel.

A seventh aspect of the invention provides a billing system for a motion picture transmission service which charges depending on the receiving quality of a motion picture based on the total motion picture information amount obtained from a motion picture code evaluator according to any one of the first through sixth aspects.

DESCRIPTION OF THE PREFERRED EMBODIMENTS

Figure 1:
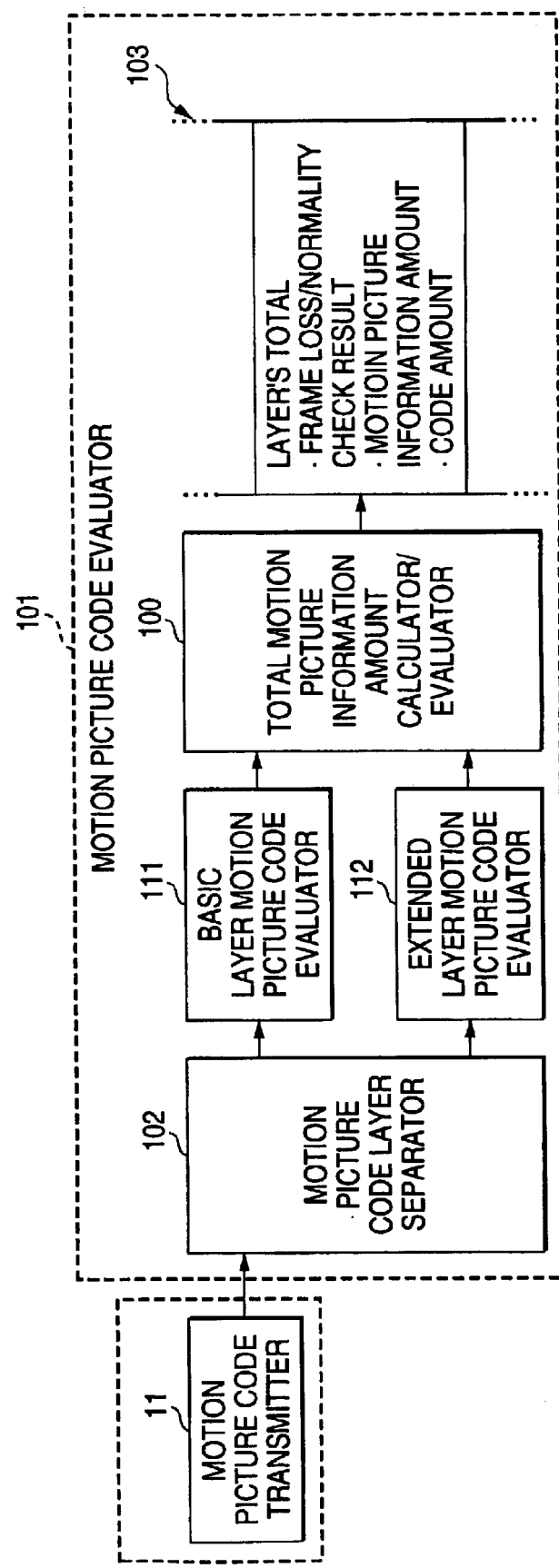
FIG. 1 is a block diagram showing the configuration of a motion picture code evaluator according to a first embodiment of the invention.
Figure 2:
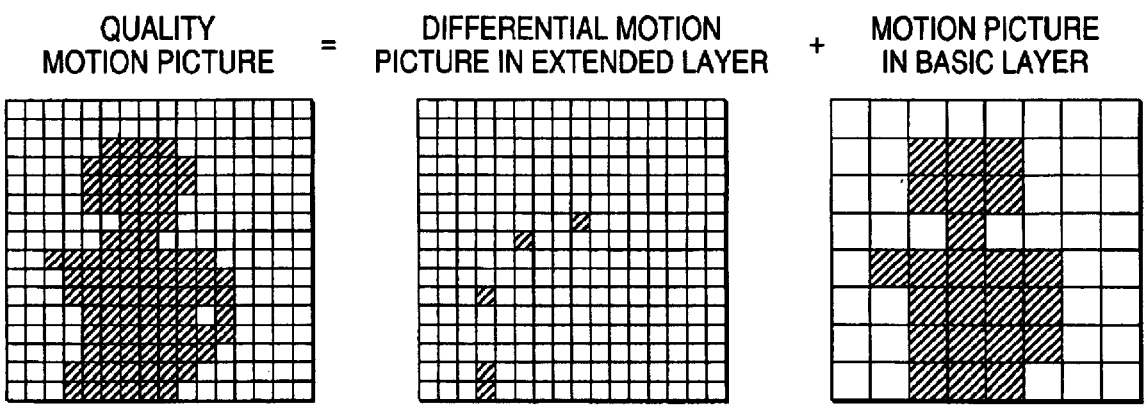
FIG. 2 is an explanatory drawing which shows an example of a scalability code.

An embodiment of the invention will be described referring to the drawings.

FIG. 1 is a block diagram showing the configuration of a motion picture code evaluator to address the scalability code.

In FIG. 1, a motion picture code transmitter 11 transmits a scalability code.

A motion picture code evaluator 101 comprises a motion picture code layer separator 102, a basic layer motion picture code evaluator 111, an extended layer motion picture code evaluator 112 and a total motion picture information amount calculator/evaluator 100. The total motion picture information amount calculator/evaluator 100 outputs the total layer frame loss/normality information, total motion picture information amount and code amount.

A motion picture code layer separator 102 receives a motion picture code comprising a scalability code transmitted from the motion picture code transmitter 11 and outputs the basic layer code to a basic layer motion picture code evaluator 111 and the extended layer code to an extended layer motion picture code evaluator 112, respectively.

The basic layer motion picture code evaluator 111 and the extended layer motion picture code evaluator 112 check the motion picture frame header of each layer.

In case the length of the motion picture frame header is incorrect, a numeric value exceeding the acceptable range is obtained when a parameter is read, or the time code to be decoded and displayed is found delayed from the specified time when the time code is read, the motion picture frame of the layer is determined as a loss.

The basic layer motion picture code evaluator 111 and the extended layer motion picture code evaluator 112 then calculates the motion picture information amount of each layer.

This process is the same as that in the motion picture code evaluator 501.

Next, the total motion picture information amount calculator/evaluator 100 outputs the motion picture information amount, frame normality/loss information and code amount of the basic layer and the extended layer.

In case the basic layer is a loss, the total motion picture information amount is zero.

In case the basic layer is normal and extended layer is a loss, the total motion picture information amount of the basic layer is employed as a total motion picture information amount.

In case both the basic layer and the extended layer are normal, the information amount to be obtained is the motion picture information amount of a motion picture obtained after synthesis of all layers. The total motion picture information amount is calculated from the motion picture code of each layer without using decoding or synthesis, by using the following method:

For a time scalability extended layer, that is, in case the extended layer adds a frame between frames of a lower-rank layer, the weight of the motion picture information amount of each layer is summed as a weight proportional to the time to next frame based on the frame time interval after the frame has been added. The sum value is employed as a total motion picture information amount.

In case the next frame is a loss, the time to the lost frame is employed as a weight. Two methods are available: from the lost frame to next normal frame, the motion picture information amount is zero, or the time to the earliest normal frame is used as a weight assuming that the immediately preceding normal frame continues during the period of loss.

For the latter, another method obtains the frame loss ratio of a specific period after calculating the total motion picture information amount of the period and multiplies the total motion picture information amount by (1-frame loss ratio) to correct the initial amount.

Which method to use may be determined depending on the situation, such as the calculation cost and the accuracy of motion picture information amount.

In case the frame rate is constant and an extended layer is inserted between just in the center between basic layer frames, the sum of the motion picture information amount of the basic layer and the motion picture information amount of the extended layer may be employed as a total motion picture information amount.

Next, how to calculate the total motion picture information amount for the space scalability extended layer will be explained.

In this method, a low-resolution image in the basic layer of a frame at a certain time is synthesized with a differential image with a high resolution in the extended layer. The resulting number of pixels after synthesis is the number of pixels in the extended layer.

The information amount of a specific pixel after synthesis is the number of gray-scale levels obtained from the quantization roughness of either the basic layer or extended layer whichever is finer.

The total sum of the number of gray-scale levels calculated across all pixels after synthesis is employed as a total motion picture information amount.

Another method simply assumes the motion picture information amount of the extended layer as a total motion picture information amount in case the number of pixels after synthesis is equal to the number of pixels in the extended layer, assuming that the quantization roughness of the extended layer is less likely to be coarser than the basic layer.

Which method to use may be determined depending on the situation, such as the calculation cost and the accuracy of motion picture information amount.

Next, how to calculate the total motion picture information amount for the SNR scalability extended layer will be explained.

In this method, an image with coarse quantization in the basic layer is synthesized with a differential image of extended layer with fine quantization. The information amount of a specific pixel after synthesis is the number of gray-scale levels obtained from the quantization roughness of either the basic layer of extended layer whichever is finer.

The total sum of the number of gray-scale levels calculated across all pixels after synthesis is employed as a total motion picture information amount.

Another method simply assumes the motion picture information amount of the extended layer as a total motion picture information amount since the number of pixels after synthesis is equal to the number of pixels in the extended layer, assuming that the quantization roughness of the extended layer is less likely to be coarser than the basic layer.

Which method to use may be determined depending on the situation, such as the calculation cost and the accuracy of motion picture information amount.

As far as the evaluation is on the basic layer alone, the output of the basic layer motion picture code evaluator 111 maybe employed as a total motion picture information amount.

In case a plurality of motion picture streams are to be simultaneously evaluated, as many number of motion picture code evaluators 101 as the number of motion picture streams may be provided for later parallel processing.

In the case of a parallel processing using a computer, a motion picture code may be buffered in the process.

Decoding of a motion picture code or regeneration of an image does not take place in this case, so that a general computer may be used for this purpose.

This is the end of explanation on the embodiment concerning the scalability code.

Figure 3:
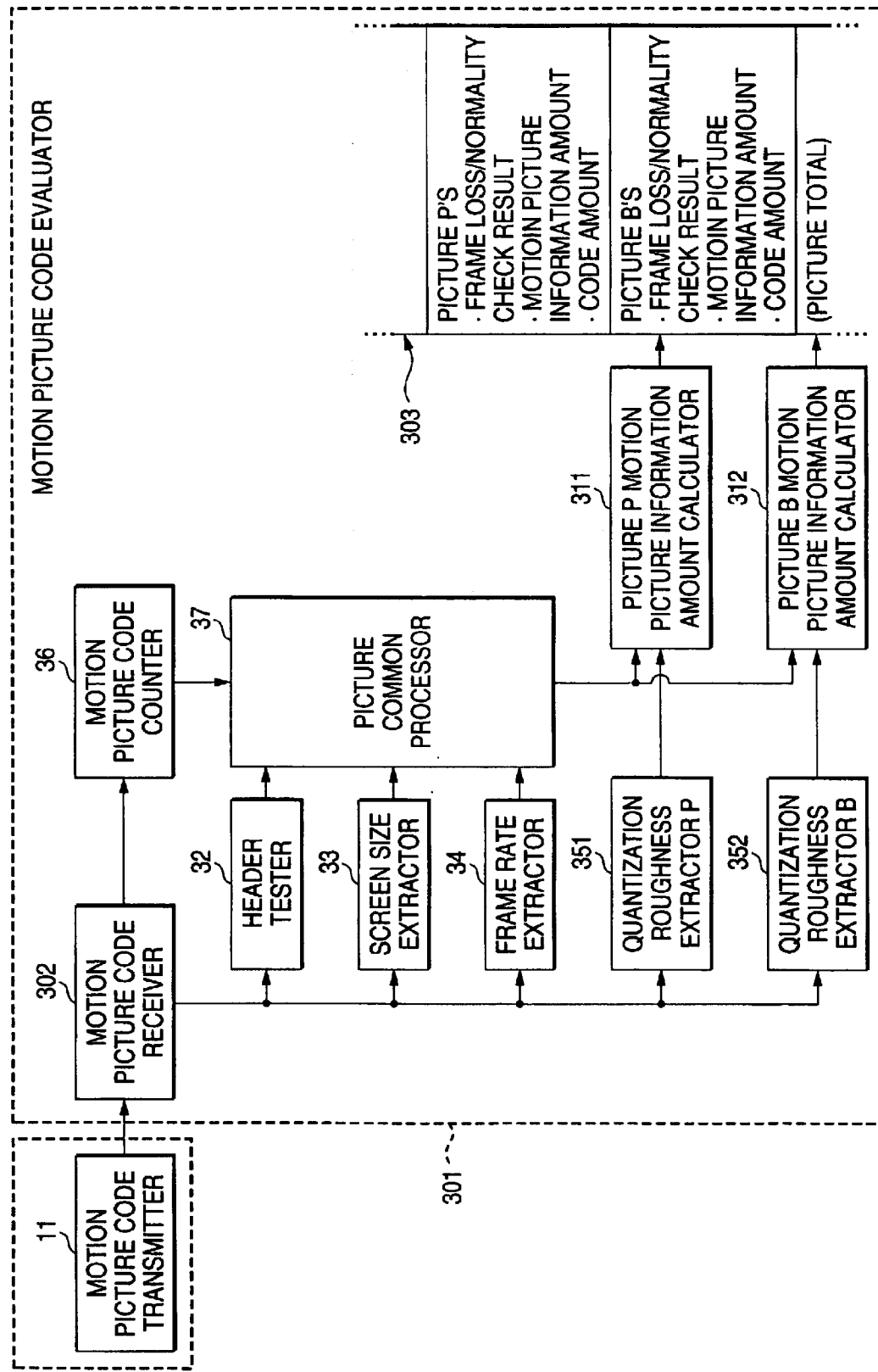
FIG. 3 is a block diagram showing the configuration of a motion picture code evaluator according to a second embodiment of the invention.

FIG. 3 is a block diagram showing the configuration of a motion picture code evaluator in the PB frame mode.

In FIG. 3, a motion picture code transmitter 11 transmits a motion picture code, a PB frame mode motion picture code in this example.

A header tester 32 extracts a motion picture frame header from the PB frame mode motion picture code received on a motion picture code receiver 302. In case any error is detected, the header tester 32 determines the corresponding motion picture frame as a loss. In case no error is detected, the header tester 32 reads the time stamp. In case a delay is detected, the header tester 32 determines the frame as a loss, and the two PB frames if any as a loss.

In case another Picture referenced by Picture P or Picture B is a loss, a frame loss is assumed.

A screen size extractor 33 reads the screen size from the frame header detected in header detector 32. A frame rate extractor 34 reads the frame rate from the frame header detected in header detector 32 or convert the frame rate from the timing of frame within certain period and number of frame header.

A quantization roughness extractor 351 reads the quantization roughness of Picture P. A quantization roughness extractor 352 reads the quantization roughness of Picture B.

Processing including the header test and screen size/frame processing is common between the two frames. A detected signal is processed by a picture common processor 37.

The motion picture information amount of Picture P is obtained by summing the number of gray-scale levels of Picture P across all pixels on a Picture P motion picture information amount calculator 311.

Similarly, the motion picture information amount of Picture B is obtained by summing the number of gray-scale levels of Picture B across all pixels on a Picture B motion picture information amount calculator 312.

As an output 303 of a motion picture code evaluator 301, the loss/normality check result, motion picture information amount, number of motion picture frame losses and motion picture code amount of the two frames are obtained.

Although not shown, these data are summed across the motion picture frame within the evaluation range.

In case a plurality of motion picture streams are to be simultaneously evaluated, as many motion picture code evaluators 301 as the number of motion picture streams may be provided for later parallel processing, as in the previous example.

In the case of a parallel processing using a computer, a motion picture code may be buffered in the process.

In this case also, decoding of a motion picture code or regeneration of an image does not take place, so that a general computer may be used for this purpose.

This is the end of explanation on the embodiment concerning the PB frame mode.

Figure 4:
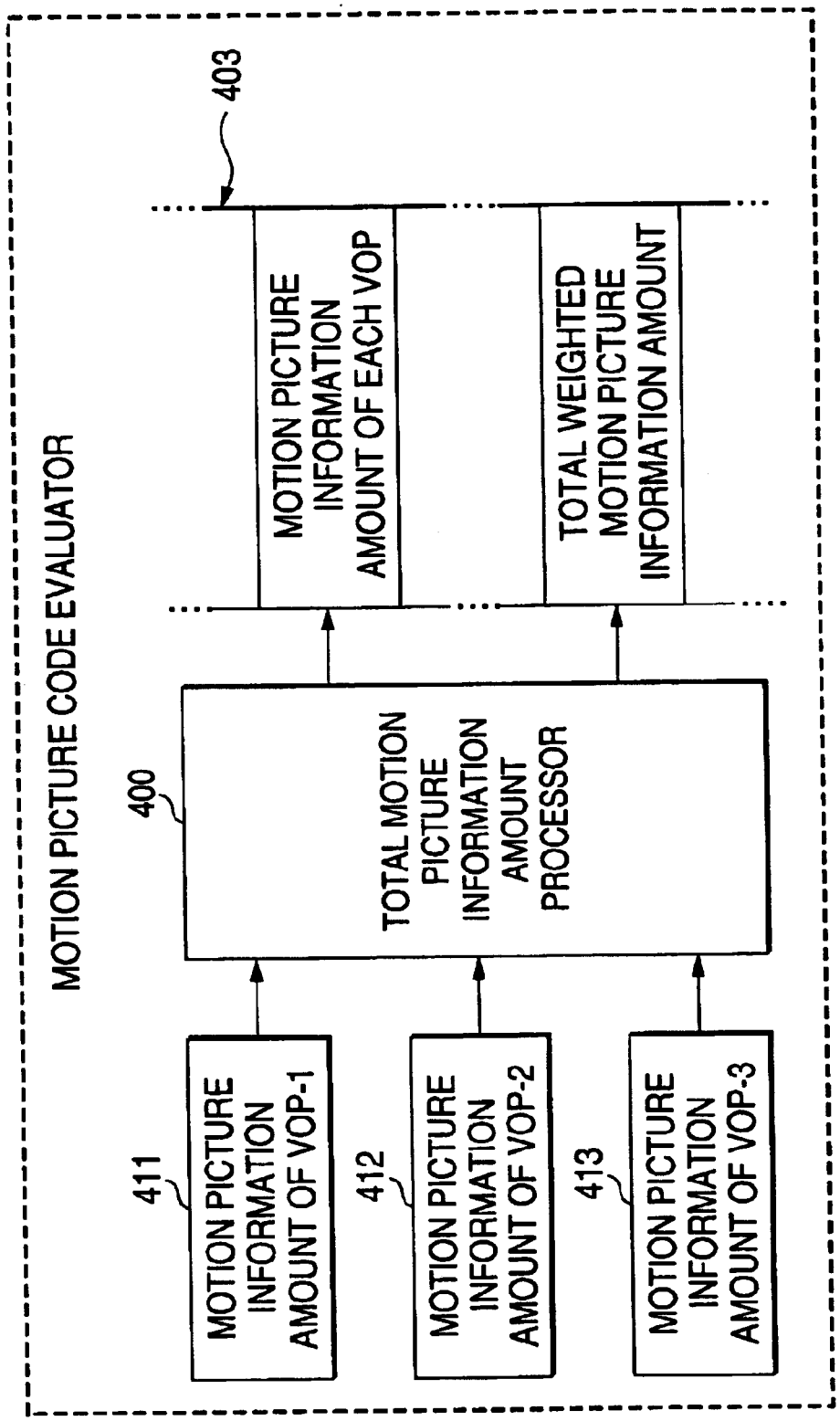
FIG. 4 is a block diagram showing the configuration of a motion picture code evaluator according to a third embodiment of the invention.
Figure 5:
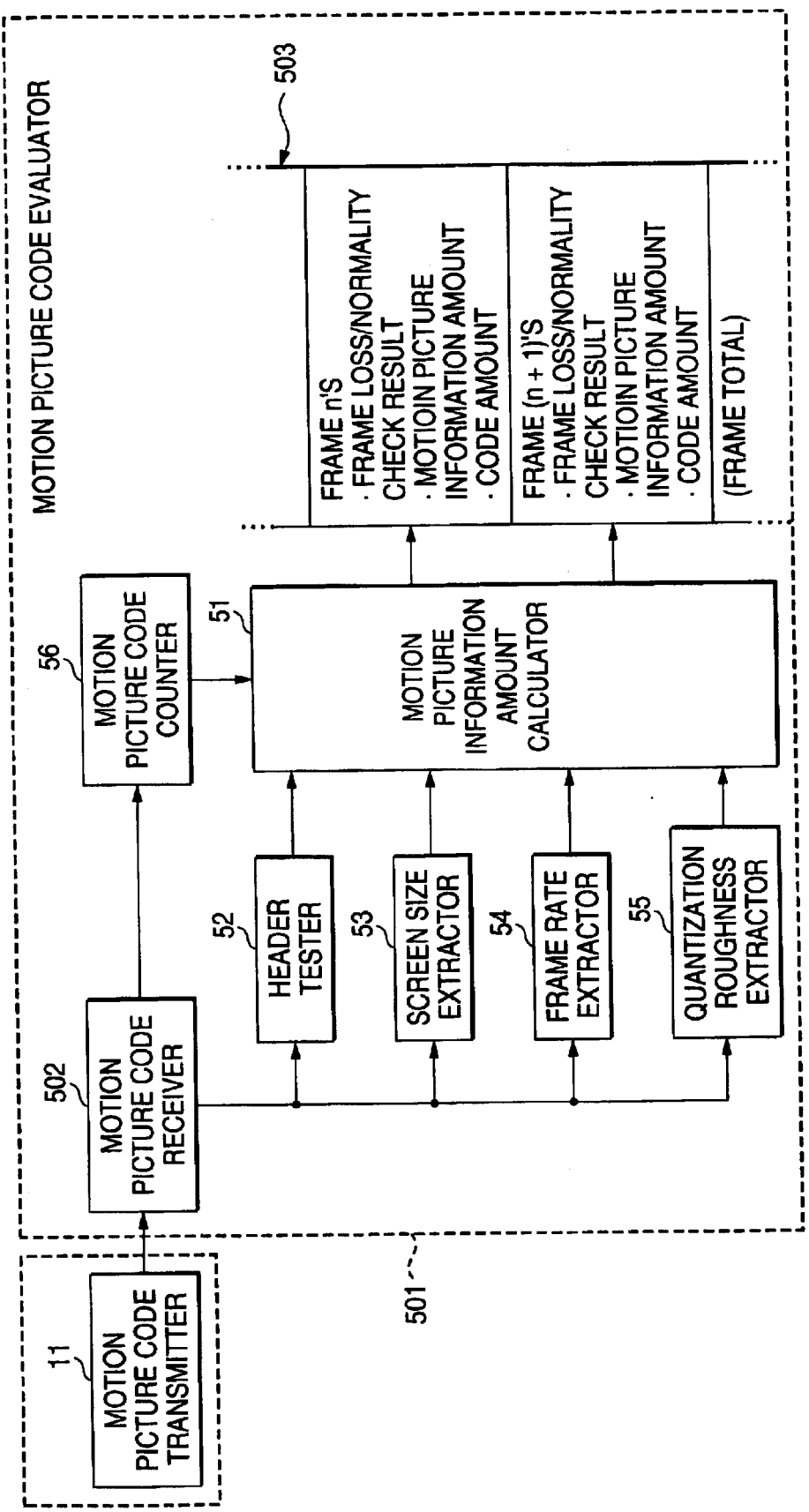
FIG. 5 is a block diagram showing the configuration of a motion picture code evaluator according to the related art (reference).

FIG. 4 is a block diagrams showing the internal configuration of a motion picture code evaluator to address the multi-object code.

For example, in a motion picture comprising three video objects, in case a frame comprises VOP-1, VOP-2 and VOP-3, a motion picture information amount 411 of VOP-1, a motion picture information amount 412 of VOP-2 and a motion picture information amount 413 of VOP-3 are input to a total motion picture information amount processor 400.

The total motion picture information amount processor 400 calculates the motion picture information amount of each VOP, sum of the motion picture information amount per video object and corrects the result with a weight of the video object to obtain a total motion picture information amount which is based on the weighted sum, and provides the resulting value at an output 403.

In case a plurality of motion picture streams are to be simultaneously evaluated, as many motion picture code evaluators in FIG. 4 as the number of motion picture streams may be provided for later parallel processing, as in the previous example.

In the case of a parallel processing using a computer, a motion picture code may be buffered in the process.

In this case also, decoding of a motion picture code or regeneration of an image does not take place, so that a general computer may be used for this purpose.

In case a single layer code, scalability code, PB frame mode and multi-object code are included in a plurality of motion picture streams, motion picture code evaluators corresponding to these codes are used to perform parallel processing.

A motion picture code evaluator is provided for load test for number of real time users of motion picture streaming system and streaming quality check of the motion picture streaming service for multiple users.

For example, it is possible to perform billing according to the receiving quality of a motion picture based on the total motion picture information amount from the motion picture code evaluator shown in FIGS. 1, 3 and 4.

The first aspect of the invention provides a motion picture code evaluator for evaluating, on a motion picture receiver for receiving via transmission means a motion picture code comprising a scalability code including a basic layer code and an extended layer code, the total post-transmission motion picture information amount which is based on a motion picture code loss caused by the transmission means and decoding the motion picture code, comprising, motion picture code layer separation means for separating the basic layer code and the extended layer code from the motion picture code received, basic layer loss determination means and extended layer loss determination means for respectively determining a loss of the basic layer code and the extended layer code separated by the motion picture code layer separation means, and motion picture code evaluation means for evaluating the total post-transmission motion picture information in accordance with the outputs of the basic layer loss determination means and the extended layer loss determination means. This makes it possible to provide a motion picture code evaluator which evaluates the motion picture information amount, motion picture frame loss and code amount of a scalability code.

The second aspect of the invention provides a motion picture code evaluator comprising, in the determination by the basic layer loss determination means, a total motion picture information amount is set to zero for a basic layer loss, while in the determination by the extended layer loss determination means, the motion picture information amount of the basic layer is employed as a total motion picture information amount for an extended layer loss and that in case the determination by the basic layer loss determination means and the extended layer loss determination means has detected no losses, a weight which is based on the frame time interval after synthesis of the basic layer and extended layer is used to obtain the sum value the motion picture information amount in the frames, which sum value is employed as a total motion picture information amount, the motion picture information amount of either the basic layer or extended layer of whichever the resolution is higher is employed as a total motion picture information amount, or the quantization roughness of either the basic layer or extended layer of whichever the quantization roughness is finer is used and the motion picture information amount obtained by adding the number of gray-scale levels across the number of pixels of the extended layer is employed as a total motion picture information amount.

The third aspect of the invention provides a motion picture code evaluator for evaluating, on a motion picture receiver for receiving via transmission means a motion picture code comprising a scalability code including a basic layer code and an extended layer code, the total post-transmission motion picture information amount which is based on a motion picture code loss caused by the transmission means and decoding the motion picture code, comprising, motion picture code layer separation means for separating the basic layer code from the motion picture code received, basic layer loss determination means for determining a loss of the basic layer code separated by the motion picture code layer separation means, and motion picture code evaluation means for evaluating the total post-transmission motion picture information in accordance with the output of the basic layer loss determination means. This makes it possible to evaluate the motion picture information amount, motion picture frame loss and code amount of a code including a scalability frame code.

The fourth aspect of the invention provides a motion picture code evaluator for evaluating, on a motion picture receiver for receiving via transmission means a PB frame mode motion picture code, the total post-transmission motion picture information amount which is based on a motion picture code loss caused by the transmission means and decoding the PB frame mode motion picture code, comprising, header test means for checking the frame header of PB frames of a motion picture code in the PB frame mode for normality or loss, screen size extraction means and frame rate extraction means for respectively reading the screen size and number of frames of the PB frames from the PB frame header, Picture P quantization roughness extraction means for reading the Picture P quantization roughness of the PB frames from the PB frame header, Picture B quantization roughness extraction means for reading the Picture B quantization roughness of the PB frames from the PB frame header, Picture P motion picture information amount calculation means for calculating the Picture P motion picture information amount from the screen size and the Picture P quantization roughness, Picture B motion picture information amount calculation means for calculating the Picture B motion picture information amount from the screen size and the Picture B quantization roughness, and totals the motion picture information amount of normal frames from the result of determination of the number of frames and the frame loss, and employs the resulting motion picture information amount as a total motion picture information amount. This makes it possible to evaluate the motion picture information amount, motion picture frame loss and code amount of a code including PB frames.

The fifth aspect of the invention provides a motion picture code evaluator for evaluating, on a motion picture receiver for receiving via transmission means a motion picture code comprising a multi-object code, the total post-transmission motion picture information amount which is based on a motion picture code loss caused by the transmission means and decoding the motion picture code, comprising, a plurality of motion picture information amount calculation means for calculating the motion picture information amount per object included in a frame of a received motion picture code comprising a multi-object code and totals the outputs of the motion picture information amount calculation means modified by a weight per object and employs the total value as a total motion picture information amount. This makes it possible to evaluate the motion picture information amount, motion picture frame loss and code amount of a multi-object code.

The sixth aspect of the invention provides a multiple motion picture stream evaluator comprising a plurality of motion picture code evaluators according to any one of the first through fifth aspects, arranged to process a plurality of motion picture streams in parallel. Image regeneration does not take place so that it is possible to simultaneously evaluate a plurality of motion picture streams.

The seventh aspect of the invention provides a billing system for a motion picture transmission service which charges depending on the receiving quality of a motion picture based on the total motion picture information amount obtained from a motion picture code evaluator according to any one of the first through sixth aspects. This implements an optimum billing system for a motion picture transmission service on the basis of the receiving quality of a motion picture.

What is claimed is:

1. A motion picture code evaluator for evaluating, on a motion picture receiver for receiving via transmission means a motion picture code comprising a scalability code including a basic layer code and an extended layer code, the total post-transmission motion picture information amount which is based on a motion picture code loss caused by said transmission means and decoding said motion picture code, comprising, motion picture code layer separation means for separating the basic layer code and the extended layer code from the motion picture code received, basic layer loss determination means and extended layer loss determination means for respectively determining a loss of the basic layer code and the extended layer code separated by said motion picture code layer separation means, and motion picture code evaluation means for evaluating the total post-transmission motion picture information amount in accordance with the outputs of said basic layer loss determination means and said extended layer loss determination means.

2. A motion picture code evaluator according to claim 1, comprising, in the determination by said basic layer loss determination means, a total motion picture information amount is set to zero for a basic layer loss, while in the determination by said extended layer loss determination means, the motion picture information amount of the basic layer is employed as a total motion picture information amount and that in case the determination by said basic layer loss determination means and said extended layer loss determination means has detected no losses, a weight which is based on the frame time interval after synthesis of the basic layer and extended layer is used to obtain the sum value the motion picture information amount in the frames, which sum value is employed as a total motion picture information amount, the motion picture information amount of either the basic layer or extended layer of whichever the resolution is the higher is employed as a total motion picture information amount, or the quantization roughness of either the basic layer or extended layer of whichever the quantization roughness is the finer is used and the motion picture information amount obtained by adding the number of gray-scale levels across the number of pixels of the extended layer is employed as a total motion picture information amount.

3. A motion picture code evaluator for evaluating, on a motion picture receiver for receiving via transmission means a motion picture code comprising a scalability code including a basic layer code and an extended layer code, the total post-transmission motion picture information amount which is based on a motion picture code loss caused by said transmission means and decoding said motion picture code, comprising, motion picture code layer separation means for separating the basic layer code and extended layer code from the motion picture code received, basic layer loss determination means for determining a loss of the basic layer code separated by said motion picture code layer separation means, and motion picture code evaluation means for evaluating the total post-transmission motion picture information amount in accordance with the output of said basic layer loss determination means.

4. A motion picture code evaluator for evaluating, on a motion picture receiver for receiving via transmission means a PB frame mode motion picture code, the total post-transmission motion picture information amount which is based on a motion picture code loss caused by said transmission means and decoding said PB frame mode motion picture code, comprising, header test means for checking the frame header of PB frames of a motion picture code in the received PB frame mode for normality or loss, screen size extraction means and frame rate extraction means for respectively reading the screen size and number of frames of the PB frames from said PB frame header, Picture P quantization roughness extraction means for reading the Picture P quantization roughness of the PB frames from said PB frame header, Picture B quantization roughness extraction means for reading the Picture B quantization roughness of the PB frames from said PB frame header, Picture P motion picture information amount calculation means for calculating the Picture P motion picture information amount from said screen size and the Picture P quantization roughness, Picture B motion picture information amount calculation means for calculating the Picture B motion picture information amount from said screen size and the Picture B quantization roughness, and totals the motion picture information amount of normal frames from the result of determination of said number of frames and said frame loss, and employs the resulting motion picture information amount as a total motion picture information amount.

5. A motion picture code evaluator for evaluating, on a motion picture receiver for receiving via transmission means a motion picture code comprising a multi-object code, the total post-transmission motion picture information amount which is based on a motion picture code loss caused by said transmission means and decoding said motion picture code, comprising, a plurality of motion picture information amount calculation means for calculating the motion picture information amount per object included in a frame of a received motion picture code comprising a multi-object code and totals the outputs of said motion picture information amount calculation means modified by a weight per object and employs the total value as a total motion picture information amount.

6. A multiple motion picture stream evaluator comprising a plurality of motion picture code evaluators according to any one of said claims 1 through 5, arranged to process a plurality of motion picture streams in parallel.

7. A billing system for a motion picture transmission service which charges depending on the receiving quality of a motion picture based on the total motion picture information amount obtained from a motion picture code evaluator according to any one of said claims 1 through 5.

* * * * *